United States Patent
Chen et al.

(10) Patent No.: US 12,459,412 B2
(45) Date of Patent: Nov. 4, 2025

(54) CONTROL ASSEMBLY FOR SEAT BELT RETRACTOR AND VEHICLE SEAT

(71) Applicant: Yanfeng International Automotive Technology Co., Ltd., Shanghai (CN)

(72) Inventors: Xu Chen, Shanghai (CN); Zhenhua Wang, Shanghai (CN); Xun Tang, Shanghai (CN); Liudong Hu, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 156 days.

(21) Appl. No.: 18/558,229

(22) PCT Filed: Jun. 2, 2022

(86) PCT No.: PCT/CN2022/096808
§ 371 (c)(1),
(2) Date: Oct. 31, 2023

(87) PCT Pub. No.: WO2022/257847
PCT Pub. Date: Dec. 15, 2022

(65) Prior Publication Data
US 2024/0217413 A1 Jul. 4, 2024

(30) Foreign Application Priority Data

Jun. 11, 2021 (CN) .......................... 202121310753.4

(51) Int. Cl.
*B60R 22/48* (2006.01)
*B60N 2/68* (2006.01)
*B60R 22/34* (2006.01)

(52) U.S. Cl.
CPC .............. *B60N 2/688* (2013.01); *B60R 22/34* (2013.01); *B60R 22/48* (2013.01)

(58) Field of Classification Search
CPC .......... B60N 2/688; B60R 22/34; B60R 22/48
See application file for complete search history.

(56) References Cited

U.S. PATENT DOCUMENTS

| 6,068,340 A | 5/2000 | Yano et al. |
| 6,254,191 B1 | 7/2001 | Yamamoto et al. |

(Continued)

FOREIGN PATENT DOCUMENTS

| CN | 1371829 A | 10/2002 |
| CN | 110027502 A | 7/2019 |

(Continued)

OTHER PUBLICATIONS

International Search Report and Written Opinion of the International Searching Authority mailed on Aug. 3, 2022, for PCT Application No. PCT/CN2022/096808, 7 total pages.

(Continued)

*Primary Examiner* — Timothy J Brindley
(74) *Attorney, Agent, or Firm* — Cooley LLP

(57) ABSTRACT

Provided is a control assembly (3) for a seat belt retractor, the control assembly comprising a first electric motor (31), a second electric motor (32), a control module (33), a third electric motor (34) and a retractor (35), wherein the control module (33) is separately connected to the first electric motor (31), the second electric motor (32) and the third electric motor (34), and collects rotation signals of the first electric motor (31) and the second electric motor (32) and outputs a compensation signal to the third electric motor (34); the rotation of the first electric motor (31) and the rotation of the second electric motor (32) are both related to the angle of the retractor (35); and the third electric motor (34) is connected to the retractor (35) and directly compensates the angle of the retractor (35).

10 Claims, 2 Drawing Sheets

(56) References Cited

U.S. PATENT DOCUMENTS

| | | | |
|---|---|---|---|
| 7,740,316 B2 | 6/2010 | Beneker et al. | |
| 11,827,175 B2 * | 11/2023 | Reed | B60R 22/20 |
| 2002/0128761 A1 | 9/2002 | Kim et al. | |

FOREIGN PATENT DOCUMENTS

| | | | | |
|---|---|---|---|---|
| CN | 111801251 A | * | 10/2020 | B60R 22/40 |
| CN | 211829020 U | * | 10/2020 | |
| CN | 212332592 U | | 1/2021 | |
| CN | 111409587 B | | 3/2021 | |
| CN | 215204794 U | | 12/2021 | |
| CN | 215513592 U | * | 1/2022 | B60R 22/34 |
| CN | 114162003 A | | 3/2022 | |
| DE | 102017104417 A1 | * | 9/2018 | B60R 22/03 |
| EP | 2460697 B1 | | 1/2013 | |
| EP | 3362326 B1 | * | 12/2019 | F16F 9/537 |
| JP | H-11-180252 A | | 7/1999 | |
| JP | 2013-091391 A | | 5/2013 | |
| JP | 2020063033 A | * | 4/2020 | |
| WO | WO-2019039389 A1 | * | 2/2019 | B60R 22/40 |
| WO | WO-2020220911 A1 | | 11/2020 | |
| WO | WO-2022257847 A1 | | 12/2022 | |
| WO | WO-2023221585 A1 | * | 11/2023 | B60N 2/18 |

OTHER PUBLICATIONS

Extended European Search Report for European Application No. 22819445.2, by Yanfeng International Automotive Technology Co., Ltd., mailed Jan. 24, 2025; 7 pages.

* cited by examiner

CONTROL ASSEMBLY FOR SEAT BELT RETRACTOR AND VEHICLE SEAT

RELATED APPLICATIONS

This application is a national stage of International Application No. PCT/CN2022/096808, filed on Jun. 2, 2022, which claims priority to Chinese Patent Application No. 202121310753.4, filed on Jun. 11, 2021. Both of the aforementioned applications are hereby incorporated by reference in their entireties.

TECHNICAL FIELD

The present disclosure relates to vehicles, and more particularly, to control assemblies for seat belt retractors and vehicle seats.

BACKGROUND ART

In the technical field of vehicle safeties, seat belts of vehicles are an important part of a passive safety system of the vehicles, and are safety protection devices for protecting passengers in case of emergency, such as emergency braking, collision or rollover of the vehicles, wherein the passengers can be bound by a belt-shaped webbing. The webbing can be rolled up through a mandrel of the seat belt retractor and secured to the vehicle through a locking tongue.

With the development of vehicle technologies, users have an increasing demand for the comfort of vehicle seats. In the development of the vehicle seats, the inclination of backrests has evolved from being fixed to be adjustable, and the adjustable angle is getting larger and larger. In some commercial vehicles, the backrests can even be adjusted to be approximately flat. Some seat belt retractors known in the art are equipped with vehicle sensing devices, which (for example, see CN110027502A) can act as a mechanical sensor in the seat belt retractor to sense the state, such as the acceleration and inclination, of the vehicle. When the vehicle is in an emergency state, the vehicle sensing device can sense this emergency state, and can promote the mandrel of the seat belt retractor to be locked to prevent the webbing from being continuously pulled out of the mandrel, so that the passengers can be well bound by the webbing and thus be well protected.

CN212332592U discloses an angle-adjusting module assembly for a seat belt retractor, in which at a predetermined initial position of the backrest, the vehicle sensing device is in a substantially vertical orientation and the seat belt can be pulled out normally; when the backrest is adjusted backward by a certain angle from the initial position, the vehicle sensing device may deviate from the vertical orientation by this angle, and meanwhile it may result in pulling of a core wire assembly by the angle-adjusting module assembly to cause the vehicle sensing device to rotate at another angle in the opposite direction, wherein said another angle can at least partially compensate the aforementioned angle, in particular, preferably substantially completely compensate the aforementioned angle, so that the vehicle sensing device can be substantially kept in the vertical orientation. However, this adjusting means known in the art is not suitable for more types of seats, for example, the seats with the function of adjusting the overall inclination of the seat cushion or the height-adjustable seats. When the seat cushion is adjusted separately, the seat cushion and the backrest may move at the same time, the angle of the backrest relative to the vertical direction may change, and the vehicle sensing device in the retractor may deviate from the vertical orientation; however, as the relative position between the seat cushion and the backrest does not change, the angle-adjusting module assembly may not work, so that the vehicle sensing device may deviate from the vertical orientation, and the seat belt cannot be pulled out normally.

CONTENT OF THE INVENTION

In order to solve the problem in the prior art that the angle-adjusting module assembly does not work in case of no change in the relative position between the seat cushion and the backrest, the present disclosure provides a control assembly for a seat belt retractor and a vehicle seat.

A control assembly for a seat belt retractor according to the present disclosure comprises a first electric motor, a second electric motor, a control module, a third electric motor and a retractor, wherein the control module is connected with the first electric motor, the second electric motor and the third electric motor respectively to collect rotation signals of the first electric motor and the second electric motor and output compensation signals to the third electric motor, rotation of the first electric motor and rotation of the second electric motor are both related to an angle of the retractor, and the third electric motor is connected with the retractor to directly compensate the angle of the retractor.

In some embodiments, the control assembly further comprises a cable, through which the retractor is connected with the third electric motor.

In some embodiments, the first electric motor and the second electric motor are both Hall electric motors.

In some embodiments, the retractor is provided with a rotatable vehicle sensing device in connection with the third electric motor.

An vehicle seat according to the present disclosure comprises the control assembly as described above.

In some embodiments, the vehicle seat comprises a seat cushion and a backrest, wherein the seat cushion is rotatably mounted on the vehicle floor, and the backrest is rotatably mounted on the seat cushion.

In some embodiments, the retractor is fixed to the backrest.

In some embodiments, the third electric motor is mounted on a side plate of the backrest through a mounting disk.

In some embodiments, the first electric motor is mounted on the seat cushion to adjust the movement of the seat cushion and a rotation of the first electric motor directly affects the angle of the retractor, and the second electric motor is mounted on the backrest to adjust the folding of the backrest and a rotation of the second electric motor directly affects the angle of the retractor.

In some embodiments, the control module is mounted on the seat cushion.

In the control assembly for a seat belt retractor and the vehicle seat according to the present disclosure, the control module collects signals of the first electric motor and the second electric motor, and outputs compensation signals in real time to the third electric motor, and the third electric motor adjusts the retractor accordingly, so that the seat belt can be used normally in the full adjustment process of the vehicle seat.

EMBODIMENTS

Now, preferred embodiments of the present disclosure will be given and described in detail with reference to the attached drawings.

Figure 1:
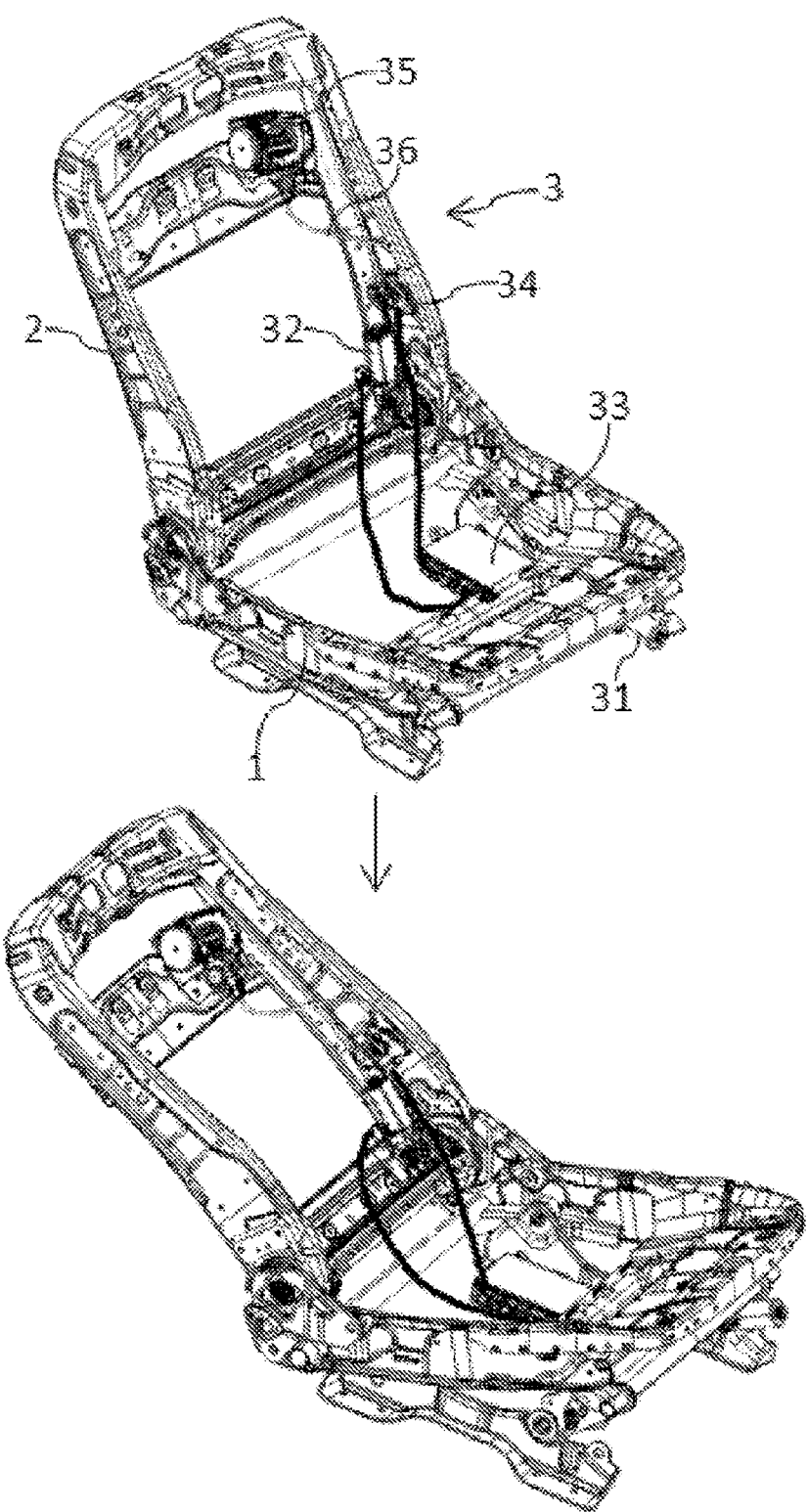
FIG. 1 is a schematic view of the overall structure of a vehicle seat including a control assembly for a seat belt retractor according to a preferred embodiment of the present disclosure.

As shown in FIG. 1, a vehicle seat according to a preferred embodiment of the present disclosure includes a seat cushion 1 and a backrest 2, wherein the seat cushion 1 is rotatably mounted on the vehicle floor so as to realize, for example, the overall inclination adjustment or height adjustment of the seat cushion, and the backrest 2 is rotatably mounted on the seat cushion 1 so as to be foldable relative to the seat cushion 1.

Figure 2:
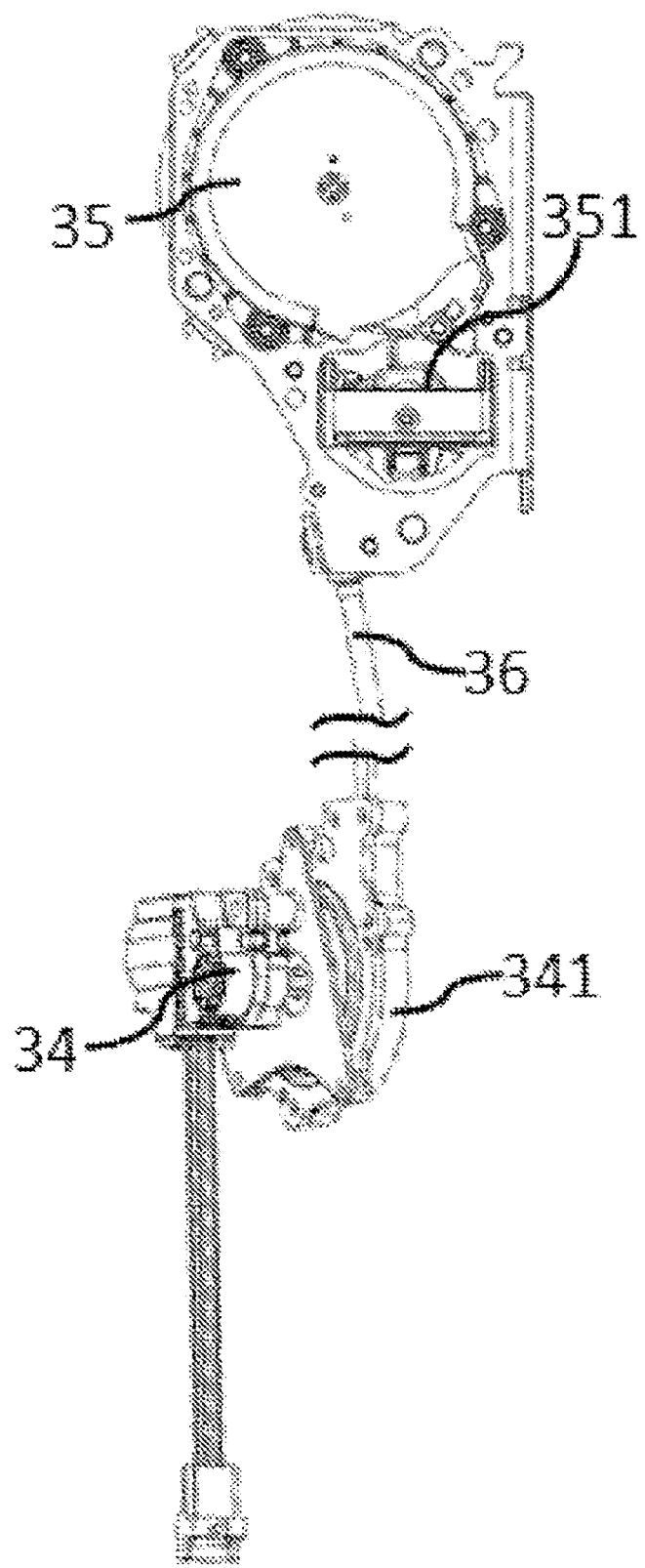
FIG. 2 is a partially enlarged view of FIG. 1.

As shown in FIG. 1, the vehicle seat further includes a control assembly 3 for the seat belt retractor, wherein the control assembly 3 includes a first electric motor 31, a second electric motor 32, a control module (ECU) 33, a third electric motor 34, a retractor 35 and a cable 36, wherein the first electric motor 31 is mounted on the seat cushion 1 to adjust a rotation of the seat cushion 1, the second electric motor 32 is mounted on the backrest 2 to adjust a folding of the backrest 2, the control module 33 is mounted on the seat cushion 1 and connected with the first electric motor 31 and the second electric motor 32, respectively, the third electric motor 34 is mounted on a side plate of the backrest 2 with bolts by means of a mounting disk 341 (see FIG. 2) and connected with the control module 33, and the retractor 35 is fixed to the backrest 2 and connected with the third electric motor 34 through the cable 36. As shown in FIG. 2, the retractor 35 is integrated therein with a rotatable vehicle sensing device 351 connected with the third electric motor 34.

In this embodiment, the first electric motor 31 and the second electric motor 32 are both Hall electric motors, in both of which Hall sensors are arranged. When the first electric motor 31 and the second electric motor 32 are moving, the Hall sensors therein may generate Hall signals that are transmitted to the control module 33. When the control module 33 receives a complete circle of Hall signals, it outputs an adjustment signal to drive the third electric motor 34 to pull the vehicle sensing device 351 in the retractor 35.

The control module 33 can calculate the adjustment posture of the seat by collecting Hall signals from the first electric motor 31 and the second electric motor 32. For example, upon adjusting the overall inclination or height of the seat cushion, although the relative position between the seat cushion 1 and the backrest 2 does not change, the control module 33 can control the third electric motor 34 to adjust the vehicle sensing device 351 in the retractor 35 in real time according to the change in the posture of the seat, so that the vehicle sensing device 351 is always kept in a vertical orientation to allow the seat belt to be pulled out normally.

It should be understood that the control module 33 extracts information on rotation of all the electric motors that may affect the angle of the retractor 35 after adjustment. In this embodiment, the electric motors that may affect the angle of the retractor 35 only include the first electric motor 31 and the second electric motor 32. If there are other electric motors that may affect the angle of the retractor 35, they may be connected with the control module 33 to have their rotation information extracted by the control module 33.

It should be understood that the control module 33 collects the Hall signals of the first electric motor 31 and the second electric motor 32, extracts information on rotation of the first electric motor 31 and the second electric motor 32, calculates the posture of the seat by superimposing the calculated adjustment angle of the seat cushion and adjustment angle of the backrest, converts it into the angle value of rotation of the retractor 35 along with the seat, and real-time outputs information on an angle of the retractor 35 to be compensated and a starting signal. The angle information and starting signal outputted by the control module 33 are transmitted to the third electric motor 34, and the third electric motor 34 pulls the cable 36 accordingly, which adjusts the vehicle sensing device 351 in the retractor 35 to allow the seat belt to be used normally in the full adjustment process of the seat. This control logic can be easily effectuated with the help of the prior art, and thus will not be described herein in detail.

Furthermore, the third electric motor 34 makes real-time adjustment, following and at the same speed as the adjustment of the seat. Moreover, the third electric motor 34 provides a self-locking structure, which ensures that the retractor 35 is in a stable state when the electric motors do not work or are powered off.

The above-mentioned description is only the preferred embodiment of the present disclosure, not to limit the scope of the present disclosure, and various changes can be made to the above-mentioned embodiments of the present disclosure. All simple and equivalent changes and modifications made according to the claims and description of this disclosure fall within the scope of protection of the claims of the present disclosure.

What is claimed is:

1. A control assembly for a seat belt retractor, wherein the control assembly comprises a first electric motor, a second electric motor, a control module, a third electric motor and a retractor, wherein the control module is connected with the first electric motor, the second electric motor and the third electric motor respectively to collect rotation signals of the first electric motor and the second electric motor and output compensation signals to the third electric motor, rotation of the first electric motor and rotation of the second electric motor are both related to an angle of the retractor, and the third electric motor is connected with the retractor to directly compensate the angle of the retractor.

2. The control assembly according to claim 1, wherein the control assembly further comprises a cable, the retractor being connected with the third electric motor through the cable.

3. The control assembly according to claim 1, wherein the first electric motor and the second electric motor are both Hall electric motors.

4. The control assembly according to claim 1, wherein the retractor is provided with a rotatable vehicle sensing device in connection with the third electric motor.

5. A vehicle seat, wherein the vehicle seat comprises the control assembly according to claim 1.

6. The vehicle seat according to claim 5, wherein the vehicle seat comprises a seat cushion and a backrest, wherein the seat cushion is rotatably mounted on a vehicle floor, and the backrest is rotatably mounted on the seat cushion.

7. The vehicle seat according to claim 6, wherein the retractor is fixed to the backrest.

8. The vehicle seat according to claim 6, wherein the third electric motor is mounted on a side plate of the backrest through a mounting disk.

9. The vehicle seat according to claim 6, wherein the first electric motor is mounted on the seat cushion to adjust a movement of the seat cushion and a rotation of the first electric motor directly affects the angle of the retractor, and the second electric motor is mounted on the backrest to adjust a folding of the backrest and a rotation of the second electric motor directly affects the angle of the retractor.

10. The vehicle seat according to claim 6, wherein the control module is mounted on the seat cushion.

* * * * *